Oct. 28, 1958  N. C. WEISHAAR  2,857,605
AUTOMOBILE TIRE SIDE-WALL WASHING MACHINE
Filed Sept. 26, 1952  2 Sheets-Sheet 1

Inventor
Norman C. Weishaar

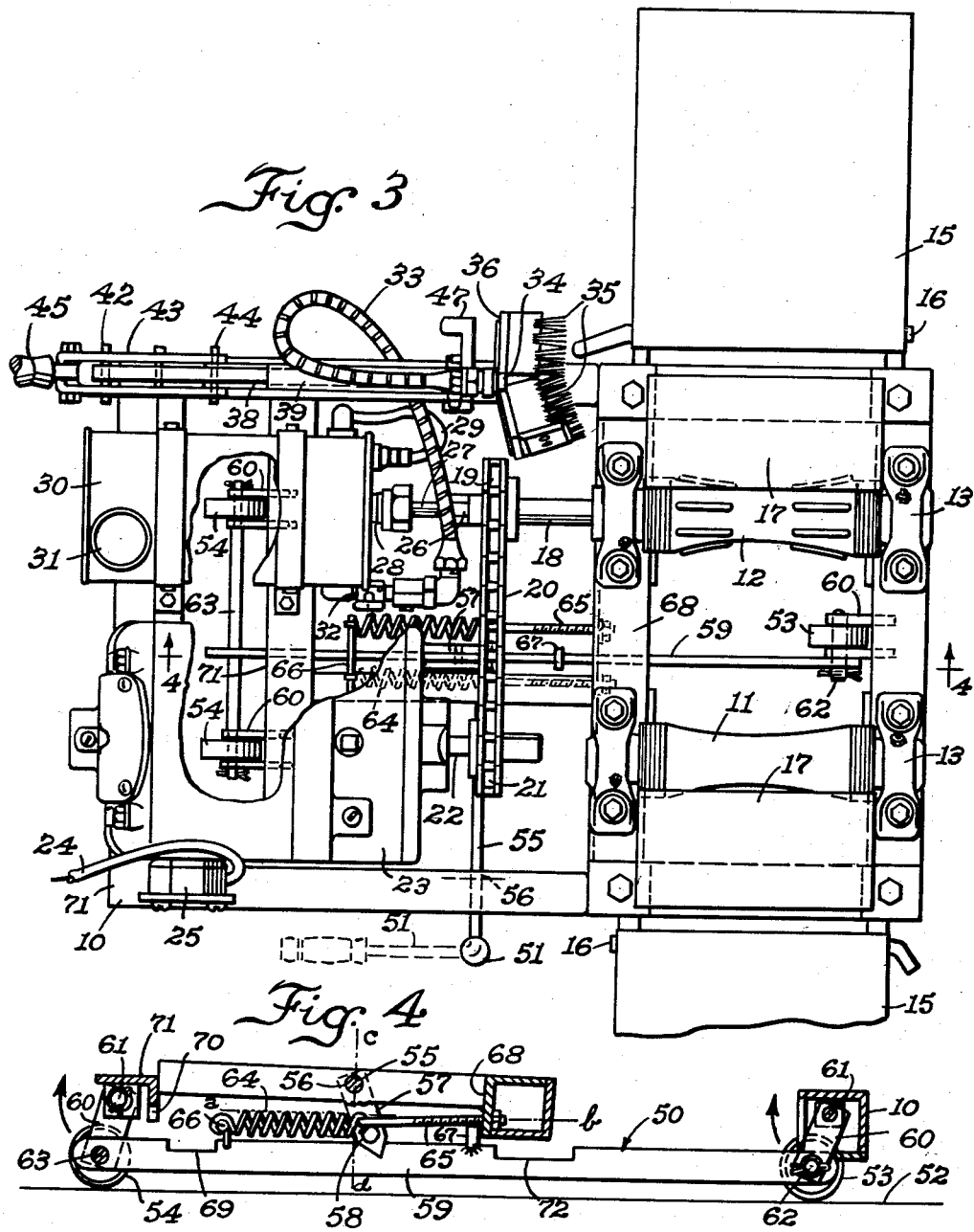

United States Patent Office 2,857,605
Patented Oct. 28, 1958

2,857,605

AUTOMOBILE TIRE SIDE-WALL WASHING MACHINE

Norman C. Weishaar, Ashton, Ill.

Application September 26, 1952, Serial No. 311,583

8 Claims. (Cl. 15—21)

This invention relates to a new and improved machine for washing automobile tire side-walls.

The principal object of my invention is to provide a portable machine of the kind described having a horizontal frame which, when not elevated for running from one place to another for use wherever needed, is adapted to rest squarely on the floor, so that a wheel, the tire of which is to be operated upon, may be rolled up onto it using either of two ramps provided on opposite sides of the frame, the latter carrying two spaced parallel rollers between these ramps which contact the tread of a tire at spaced points for support of the wheel and also for driving the same during the washing operation, one of the rollers being adapted to be driven by an electric motor that is also mounted on the frame. In other words, the present machine is adapted to be moved easily from place to place in a garage or service station for operation on the tires of any selected car so as to avoid the necessity of moving the car to the machine.

Another important object of my invention is to provide a machine of the kind described, in which the motor that drives the wheel also drives a pump to which cleaning fluid is delivered by gravity from a tank mounted on the frame of the machine, the pump discharging the fluid under pressure through a spray nozzle between two brushes mounted on a carrier that is manually reciprocable toward and away from the tire and oscillatable in a transverse direction on a support pivoted to the frame of the machine, whereby to enable quickly doing a good scrubbing job on the side-wall of a tire while the wheel is rotated. The range of oscillatory movement of the brushes is enough to enable operating on the side-walls of tires of different sizes.

The invention is illustrated in the accompanying drawings, in which—

Fig. 3 is a top view, partly broken away, and

Fig. 4 is a section on the line 4—4 of Fig. 3.

The same reference numerals are applied to corresponding parts throughout the views.

Figure 1:
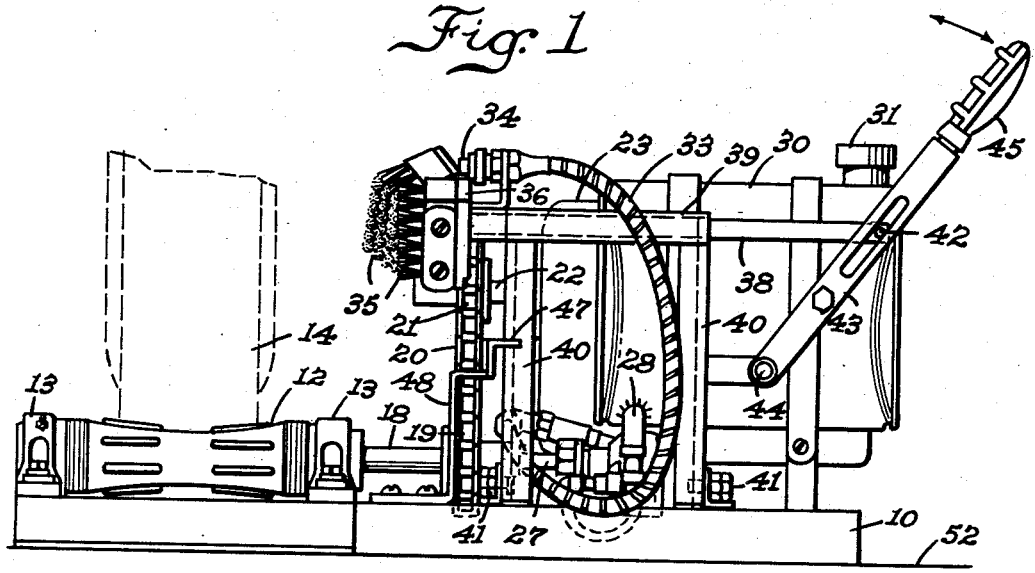
Fig. 1 is an end view of a machine embodying my invention.
Figure 2:
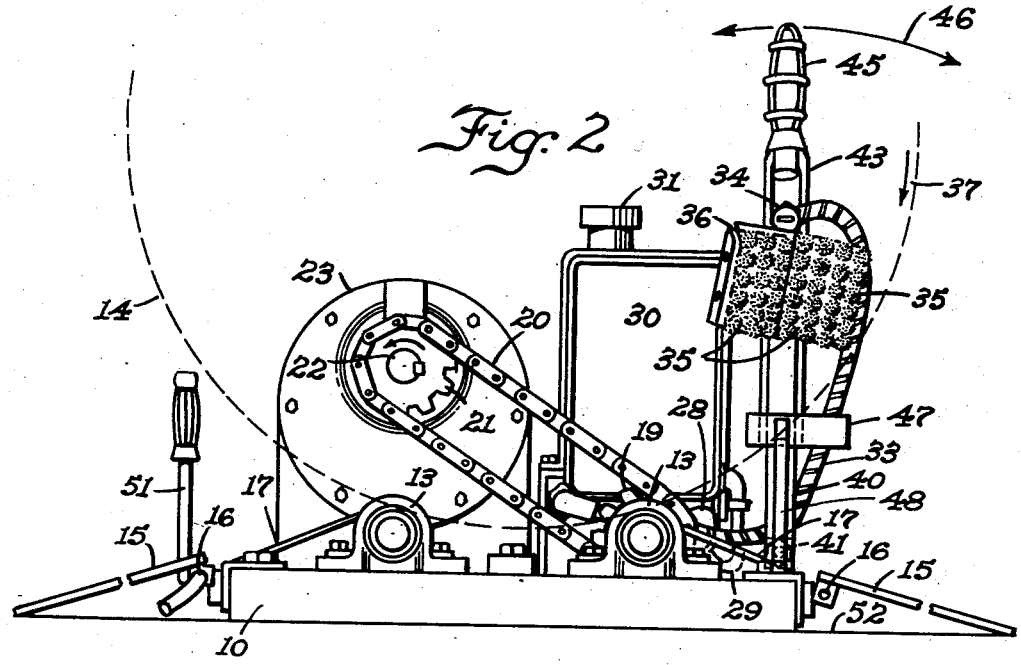
Fig. 2 is a side view taken from the inner side.

Referring to the drawings, the reference numeral 10 designates the generally rectangular frame of the machine, on the top and at one side of which a pair of elongated rollers 11 and 12 are mounted in spaced parallel relation in suitable bearings 13 for contact with the tread of a tire at spaced points for support of the wheel and also for driving the same during the washing operation, the periphery of such a tire being indicated in dotted lines at 14 in Figs. 1 and 2. A pair of ramps 15 are pivoted, as at 16, to the frame 10 at the front and back of the frame next to fixed ramps 17 provided on top of the frame at the front and back ends, which permits running a wheel up onto the rollers 11 and 12 from either direction and, after the entire side-wall washing job is done, running the wheel off again in either direction.

The roller 12 has a shaft 18 extending therefrom carrying a sprocket 19 on the outer end, and this sprocket has a chain 20 meshing with it running on a sprocket 21 mounted on the armature shaft 22 of an electric motor 23. This motor is suitably fixed on top of the frame 10, and has an extension cord 24 extending from its outlet box 25 adapted to be plugged into any convenient socket. A switch (not shown) is preferably provided to enable turning the motor on or off at the machine. A coupling, indicated at 26, provides a driving connection between the shaft 18 and another shaft 27 which extends from and serves as the drive shaft for a pump 28. This pump has cleaning solution delivered to the intake side thereof through a flexible tube 29 from a gravity tank 30 that is suitably supported on top of the frame 10 alongside the motor 23. The tank has a filler cap 31 on the top thereof and holds several gallons of cleaning solution, enough to keep the machine running for an appreciable time, inasmuch as it takes very little cleaning solution to wash the side-walls of the four wheels on a car. The cleaning solution is conducted from the outlet side of the pump through a valve 32 (Fig. 3) and a flexible conduit 33 to spray nozzle 34 provided between two scrub brushes 35 on a carrier 36. In that way, as the wheel is driven, enough cleaning solution needed for washing the side-wall is discharged in substantially the correct relationship to wheel movement for uniform and economical application of the cleaning solution, and the operator can, if he so desires, close the valve 32 when he thinks there has been enough solution discharged, and he can continue the scrubbing operation beyond that to whatever extent the dirtiness of the tire sidewall seems to require. When the valve 32 is closed, an overload relief valve (not shown) provided in the pump opens to permit bypassing of cleaning solution from the outlet side of the pump to the inlet side, thus permitting the driving of the roller 12 without continuing the discharge of cleaning solution. The direction of drive of the tire 14 is indicated by the arrow 37 in Fig. 2, and, inasmuch as the nozzle 34 is disposed above and between the brushes 35, it will be evident that the brushes come into play the instant after the side-wall is wetted with the cleaning solution, even before there is any opportunity for the cleaning solution striking the side-wall to rebound, thereby getting the maximum good out of the solution and causing a minimum of objectionable spatter onto the operator and a car that may be standing nearby.

The brush carrier 36 is rigidly mounted on the end of a rod 38 reciprocable in a guide 39 carried on the upper end of two arms 40 that are pivotally mounted at their lower ends on top of the frame 10, as indicated at 41. The rod 38 has a pin and slot connection, as indicated at 42, with a hand lever 43 that is pivotally mounted, as at 44, on the side of one of the two arms 40, whereby to permit the operator who takes hold of the handle 45, provided on the outer end of the lever 43, to give the brushes 35 an inward motion toward the side-wall of the tire and, then, a lateral motion to locate the brushes in the correct relationship to the side-wall before they are pressed against the tire, after which a certain amount of oscillation may be given the brushes by oscillation of the handle 45, if the operator finds that that will help to do a better job in a given instance. In other words, the hand lever 43 is mounted for universal pivotal movement with respect to the frame 10 to position the brushes 35 properly with respect to the tire side-wall and thereafter oscillate the brushes substantially radially of the wheel with the brushes in contact with the tire side-wall. Thus, the position of the brushes 35 is not fixed but is adjustable, both to enable doing a better cleaning job, without streaks, and to adapt the machine to operation on tires of different sizes, the oscillation of the brushes being in a direction at an angle to the radius of the wheel, as indicated by the arc 46 in Fig. 2, which, incidentally, also indicates the range of oscillatory movement permitted by the limiting yoke 47. The latter is supported on top of the frame 10 by means of a bracket 48, and has the one arm 40 arranged to oscillate with respect to it between the two limits.

The frame 10 is adapted to rest squarely on the floor during the side-wall washing operations, but the machine is, nevertheless, designed for quick portability, so as to be movable from one car to another readily and from wheel to wheel on a car. For quick portability of the machine, a dolly is provided under the frame 10, as indicated generally by the reference numeral 50. This dolly 50 is under the control of a hand lever 51, so that when the lever 51 is disposed in a vertical position, as shown in Figs. 2 and 3, the dolly 50 is in upwardly retracted position and the frame 10 rests on the floor 52, as shown in Figs. 1 and 2. However, when the lever 51 is swung to the left in Fig. 3 through about ninety degrees (90°), as indicated in dotted lines, the dolly 50 is lowered in relation to the frame 10, as shown in Fig. 4, thereby elevating the frame 10 off the floor 52 for easy rolling on wheels 53 and 54, the shaft 55 supported in bearings 56 provided in the frame 10 being attached at its inner end to a fork 57 that has a pin and slot connection, as indicated at 58, with the longitudinal frame member 59 of the dolly 50, so as to move the dolly from retracted position to operative position in the ninety degree (90°) movement of the lever. Pairs of toggle links 60 are pivoted on the underside of the frame 10 at one end, as indicated at 61, and provide forks for the wheels 53 and 54 at their other end, the wheel 53 being carried on an axle 62 passing through the lower ends of the one pair of links 60 and through the one end of the frame member 59, and another axle 63 being provided for the two other wheels 54 in a similar manner and extending through the other end of the frame member 59. A pair of coiled tension springs 64, pivotally adjustably secured at their one end by means of bolts 65 to the frame 10, are connected at their other ends to a cross-pin 66 on the frame member 59 and serve to hold the dolly under spring tension either in the lowered operative position shown in Fig. 4, which is on one side of a dead-center line a—b, or in a raised inoperative position, which is on the other side of said dead-center line. In the lowered operative position of the dolly 50, a lug 67 projecting upwardly from the frame member 59 engages the cross-member 68 of the frame 10, as shown in Fig. 4, to limit movement in one direction. In the retracted position of the dolly 50, the notched portion 69 of frame member 59 engages in a notched portion 70 in one end member 71 of the frame 10, and the notched portion 72 in frame member 59 receives the cross-member 68. The fork 57 in the movement of the dolly from one extreme position to the other moves from one side to the other of a dead-center line c—d, indicated in Fig. 4. Consequently there is no danger of the dolly 50 accidentally moving from its lowered operative position to its raised inoperative position in the event any unusual load is placed on it, as, for instance, if someone steps on the frame, because in that event the fork 57 will tend to move in a counterclockwise direction as viewed in Fig. 4, and the lug 67, which is in contact with the cross-member 68, will assume the load and prevent any movement. The use of three rollers—a single roller 53 at one end of member 59, and two rollers 54 at the other end—assures steadiness and freedom from tilting of the machine when the dolly 50 is down in its operative position. The disposition of the rollers 53 and 54 with their axes at right angles to the rollers 11 and 12 is advantageous, because it enables rolling the machine into place in front of or behind a wheel from alongside the car.

In operation, the machine is rolled up to the car on which the tire side-walls are to be washed, and is run sidewise into position in front of or behind a wheel, depending upon whether it is handier to run the car forward or to the rear to get a wheel to be washed up onto the rollers 11 and 12. Lever 51 is swung up to cause dolly 50 to be raised and frame 10 to be set down onto the floor, after which the wheel to be washed is run up onto rollers 11 and 12. Then the motor 23 is started to cause the wheel to be turned, and the brushes 35 are moved by means of handle 45 into position in readiness for operation on the side-wall. Valve 32 is opened and left open as long as cleaning solution from tank 30 is to be discharged under pressure from nozzle 34, when the valve 32 is closed again. The brushes 35 can be pressed against the tire side-wall and also moved substantially radially of the wheel to do a good scrubbing job with the cleaning solution. The brushes work well below the hub level of the wheel, so that it makes no difference if the wheel is enclosed down to that level. After a side-wall has been scrubbed, it can be wiped clean and dry while the wheel is still being turned by power. Then the motor 23 is stopped and the wheel is run off the machine. Lever 51 is swung down to lower dolly 50 and raise frame 10, and then the machine is rolled out from under the car and moved to the next wheel to be operated upon.

It is believed the foregoing description conveys a good understanding of the objects and advantages of my invention. The appended claims have been drawn to cover all legitimate modifications and adaptations.

I claim:

1. In an automobile wheel washer, a portable frame constructed to rest on the floor positioned under and to support one wheel of an automobile at a time and adapted to be moved from wheel to wheel of the automobile, and carrying a pair of spaced parallel rollers for supporting and driving an automobile wheel by contact with the tread of a tire thereon, drive means connected with one of said rollers for rotating it and thereby turning the wheel, and manually operable brush means including a substantially horizontally reciprocable rod carrying a brush means on one end for movement toward and away from the tire to be cleaned, a substantially horizontal guide for said rod mounted on an upright frame oscillatably mounted with respect to said portable frame about an axis parallel to the reciprocatory movement of the rod, and handle means on the other end of said rod by means of which the rod is adapted to be reciprocated and the rod with the upright frame given oscillatory movement to move the brush means in contact with the side-wall of a tire substantially radially relative to the tire on said wheel for washing the tire on the wheel while it is being turned.

2. In an automobile wheel washer, a portable frame constructed to rest on the floor positioned under and to support one wheel of an automobile at a time and adapted to be moved from wheel to wheel of the automobile, and carrying a pair of spaced parallel rollers for supporting and driving an automobile wheel by contact with the tread of a tire thereon, drive means connected with one of said rollers for rotating it and thereby turning the wheel, manually operable brush means mounted on said frame for movement toward and away from the wheel and for transverse reciprocatory movement substantially radially relative to a tire on said wheel for washing the tire on the wheel while it is being turned, a pump also drivingly connected with said drive means so as to be driven while the wheel is being turned, a source of cleaning solution connected with the intake of said pump, and a discharge nozzle connected by means of a flexible hose with the outlet of said pump and mounted for movement with the brush means so as to be directed toward the side of the tire in close proximity to the brush means.

3. An apparatus for cleaning the side-wall of a tire, said apparatus comprising a frame and rollers mounted thereon for supporting and driving a wheel of the vehicle on which wheel the tire whose side-wall is to be washed is mounted, means for driving at least one of said rollers, manually operable brush means mounted on said frame for movement toward and away from the wheel and for transverse reciprocatory movement substantially radially relative to a tire on said wheel for washing the tire on the wheel while it is being turned, and a nozzle mounted for movement with the brush means for discharging a cleaning solution onto the side-wall of the tire as the wheel is turned.

4. An apparatus for cleaning the side-wall of a tire, said apparatus comprising a frame and rollers mounted thereon for supporting and driving a wheel of the vehicle on which wheel the tire whose side-wall is to be washed is mounted, means for driving at least one of said rollers, brush means mounted on said frame for movement toward and away from the wheel and for transverse reciprocatory movement substantially radially relative to a tire on said wheel for washing the tire on the wheel while it is being turned, a hand lever operatively connected with said brush means and mounted for pivotal movement in one plane to move the brush means toward and away from the wheel, said lever being also mounted for pivotal movement in a transverse plane to reciprocate the brush means substantially radially relative to a tire on the wheel, and means for supplying liquid to said brush means.

5. An apparatus for cleaning the side-wall of a tire, said apparatus comprising a frame and rollers mounted thereon for supporting and driving a wheel of the vehicle on which wheel the tire whose side-wall is to be washed is mounted, means for driving at least one of said rollers, a brush supported for scrubbing contact with the side-wall of the tire as the wheel is turned, said brush having a support movable toward and away from the side-wall of the tire and also movable transversely for reciprocation generally radially of the wheel and tire, and a single manually operable lever mounted for universal pivotal movement and connected with said brush support for giving said brush both of the aforesaid movements.

6. In a tire side-wall washing machine of the kind described, a horizontal frame, a pair of spaced parallel rollers mounted in a horizontal plane thereon adapted for supporting and driving a wheel of an automobile, an electric motor mounted on said frame and having its armature shaft drivingly connected with one of said rollers, an upright frame oscillatably supported on said horizontal frame for pivotal movement on an axis parallel to said rollers, a brush carried on a rod reciprocable horizontally in a guide provided on said upright frame for movement toward and away from contact with the side-wall of a tire on a wheel resting on said rollers, a hand lever pivoted on said upright frame and connected with said rod to move it to and fro and also adapted to swing said upright frame to give the brush lateral movement substantially radially of the side-wall of the tire, and a nozzle mounted to move with the brush and connected by a flexible conduit with a source of liquid supply.

7. In a tire side-wall washing machine of the kind described, a horizontal frame, a pair of spaced parallel rollers mounted in a horizontal plane thereon adapted for supporting and driving a wheel of an automobile, an electric motor mounted on said frame and having its armature shaft drivingly connected with one of said rollers, an upright frame oscillatably supported on said horizontal frame for pivotal movement on an axis parallel to said rollers, a brush carried on a rod reciprocable horizontally in a guide provided on said upright frame for movement toward and away from contact with the side-wall of a tire on a wheel resting on said rollers, a handle connected with said rod to move it to and fro and also adapted to swing said upright frame to give the brush lateral movement substantially radially of the side-wall of the tire, and a nozzle mounted to move with the brush and connected by a flexible conduit with a source of liquid supply.

8. In an automobile wheel washer, a portable frame constructed to rest on the floor positioned under and to support one wheel of an automobile at a time and adapted to be moved from wheel to wheel of the automobile, and carrying a pair of spaced parallel rollers for supporting and driving an automobile wheel by contact with the tread of a tire thereon, drive means connected with one of said rollers for rotating it and thereby turning the wheel, and manually operable brush means including a substantially horizontally reciprocable rod carrying a brush means on one end for movement toward and away from the tire to be cleaned, a substantially horizontal guide for said rod mounted on an upright frame oscillatably mounted with respect to said portable frame about an axis parallel to the reciprocatory movement of the rod, and a hand lever pivotally mounted at one end on said upright frame and operatively connected intermediate its ends with the other end of said rod whereby oscillation of said lever in the plane of said upright frame transmits reciprocatory movement to said rod to position the brush means next to a tire on said wheel and lateral movement of said lever oscillates said upright frame to move said brush means substantially radially relative to the tire for washing the side-wall of the tire on the wheel while it is being turned.

References Cited in the file of this patent

UNITED STATES PATENTS

| | | |
|---|---|---|
| 1,412,732 | Young | Apr. 11, 1922 |
| 1,909,869 | Randrup | May 16, 1933 |
| 2,025,780 | Rosebrook | Dec. 31, 1935 |
| 2,201,774 | Hofele | May 21, 1940 |
| 2,257,255 | Yingling | Sept. 30, 1941 |
| 2,319,581 | Brownlee et al. | May 18, 1943 |
| 2,624,590 | Tilton | Jan. 6, 1953 |
| 2,636,198 | Wilson | Apr. 28, 1953 |